No. 717,443. Patented Dec. 30, 1902.
J. F. McELROY.
COMBINED MAGNETIC AND MECHANICAL BRAKE.
(Application filed July 14, 1899.)

(No Model.) 4 Sheets—Sheet 1.

Witnesses
W. S. Morrison
A. V. A. McHarg

Inventor
James F. McElroy
by Ward & Cameron
Attys

No. 717,443.　　　　　　　　　　　　　　　　Patented Dec. 30, 1902.
J. F. McELROY.
COMBINED MAGNETIC AND MECHANICAL BRAKE.
(Application filed July 14, 1899.)

(No Model.)　　　　　　　　　　　　　　　　　4 Sheets—Sheet 3.

Witnesses
W. S. Morrison
A. V. A. McHarg

Inventor
James F. McElroy
by Ward & Cameron
Attys

No. 717,443. Patented Dec. 30, 1902.
J. F. McELROY.
COMBINED MAGNETIC AND MECHANICAL BRAKE.
(Application filed July 14, 1899.)
(No Model.) 4 Sheets—Sheet 4.
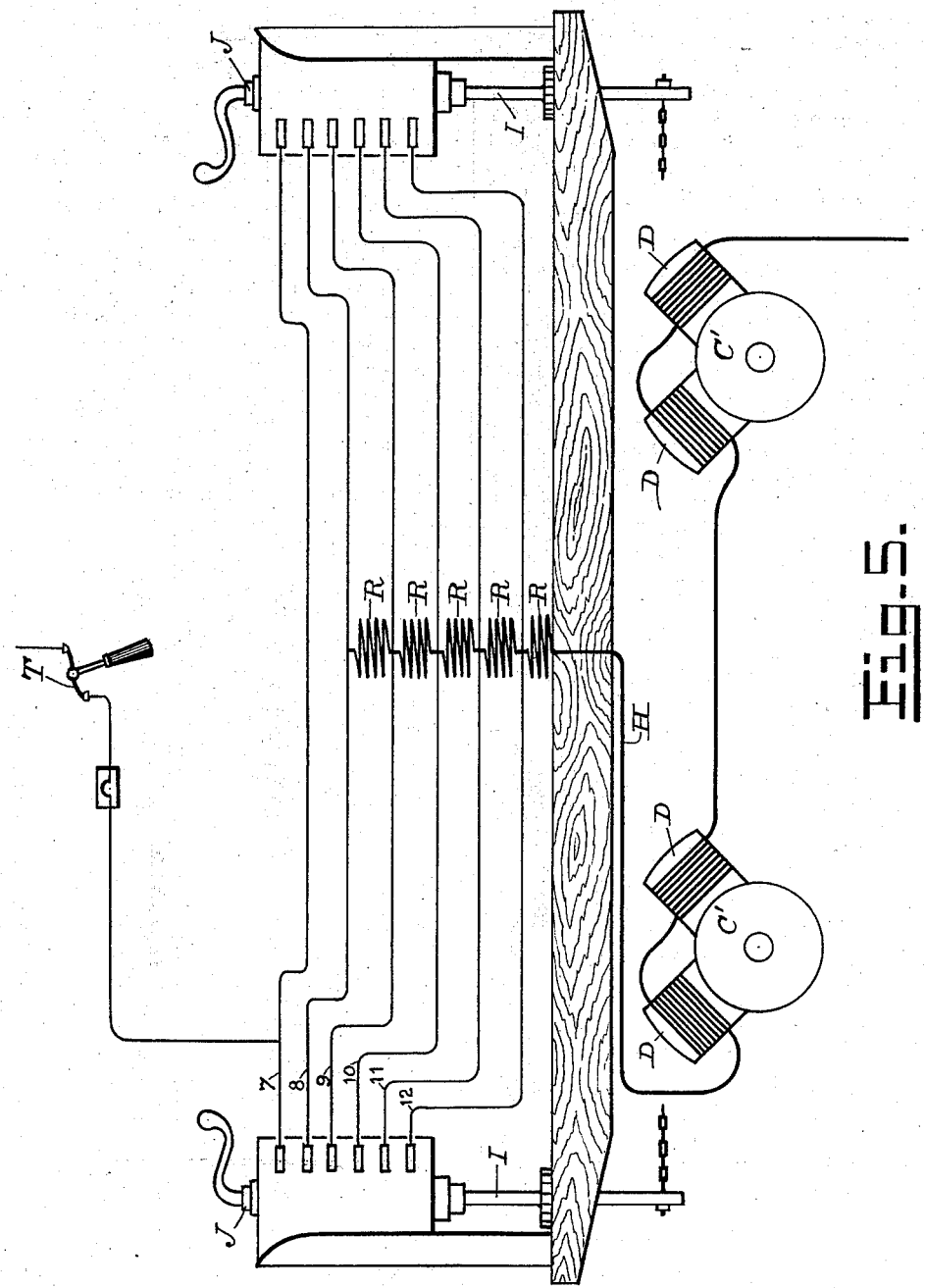

UNITED STATES PATENT OFFICE.

JAMES F. McELROY, OF ALBANY, NEW YORK, ASSIGNOR TO CONSOLIDATED CAR-HEATING COMPANY, OF ALBANY, NEW YORK.

COMBINED MAGNETIC AND MECHANICAL BRAKE.

SPECIFICATION forming part of Letters Patent No. 717,443, dated December 30, 1902.

Application filed July 14, 1899. Serial No. 723,862. (No model.)

*To all whom it may concern:*

Be it known that I, JAMES F. MCELROY, a citizen of the United States of America, and a resident of Albany, in the county of Albany and State of New York, have invented certain new and useful Improvements in a Combined Magnetic and Mechanical Brake, of which the following is a specification.

My invention relates to combined magnetic and mechanical brakes; and the object of my invention is to provide a magnetic brake attachment in connection with a mechanical brake so arranged that by the operation of the brake-handle a constantly-increasing magnetic force may be applied which will tend to operate a brake shoe or strap in contact with the armature shaft or a wheel thereon until the maximum amount of the magnetic force is applied, after which the brake may act mechanically. I attain this object by means of the mechanism illustrated in the accompanying drawings, in which—

Figure 1:
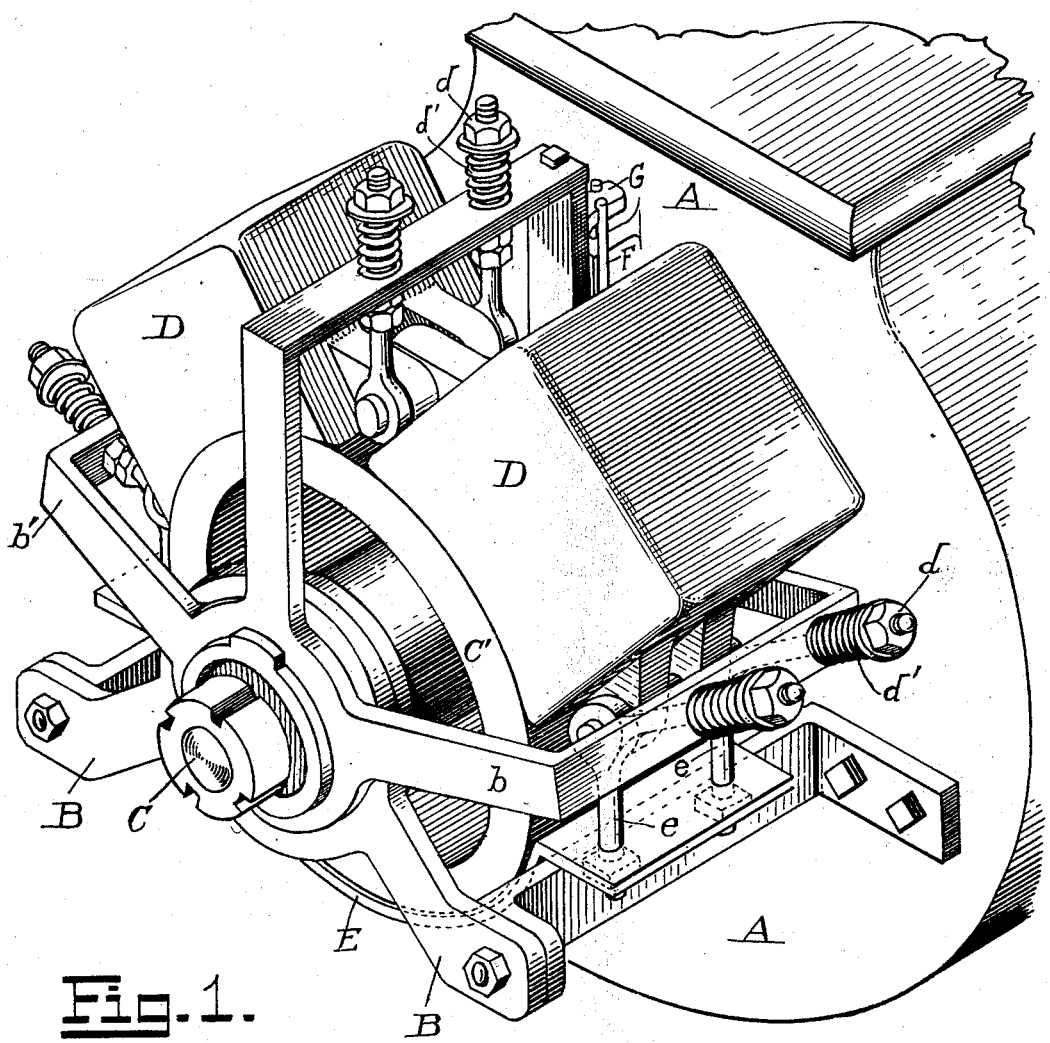
Figure 2:
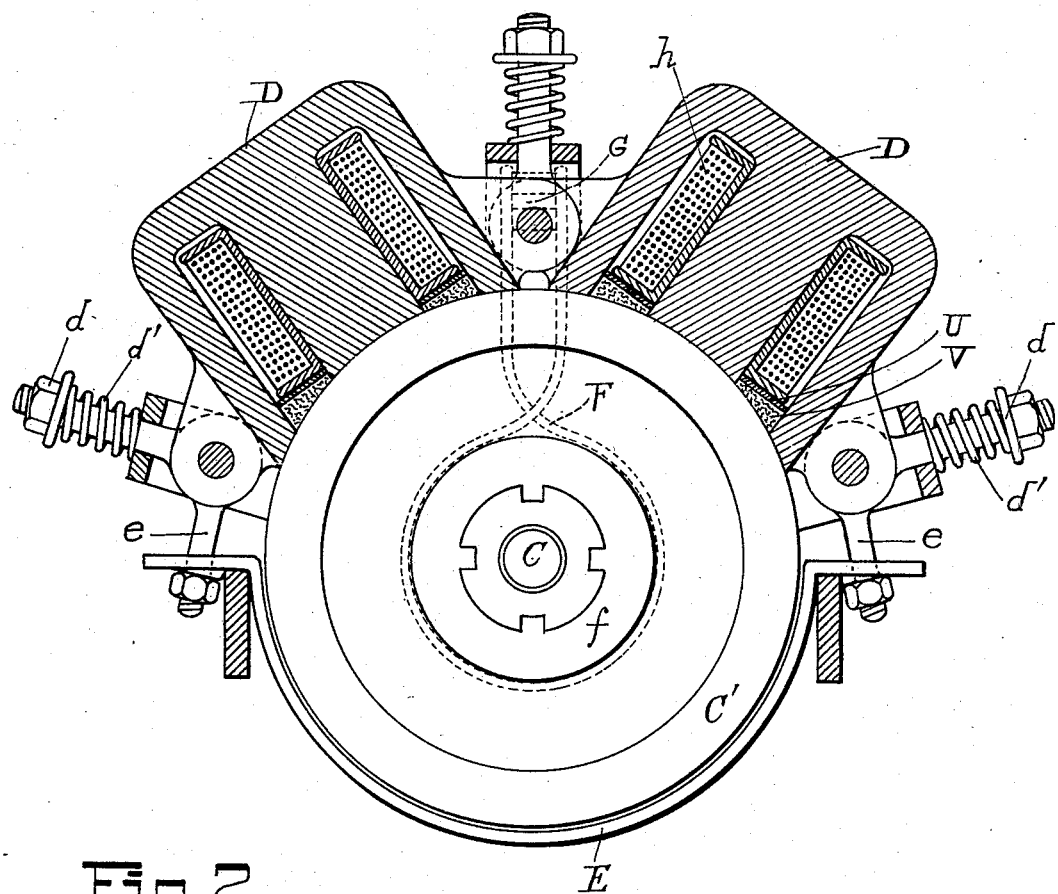
Figure 3:
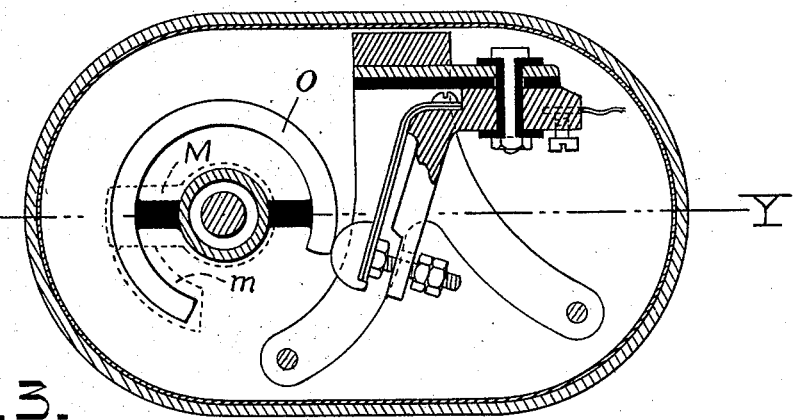
Figure 4:
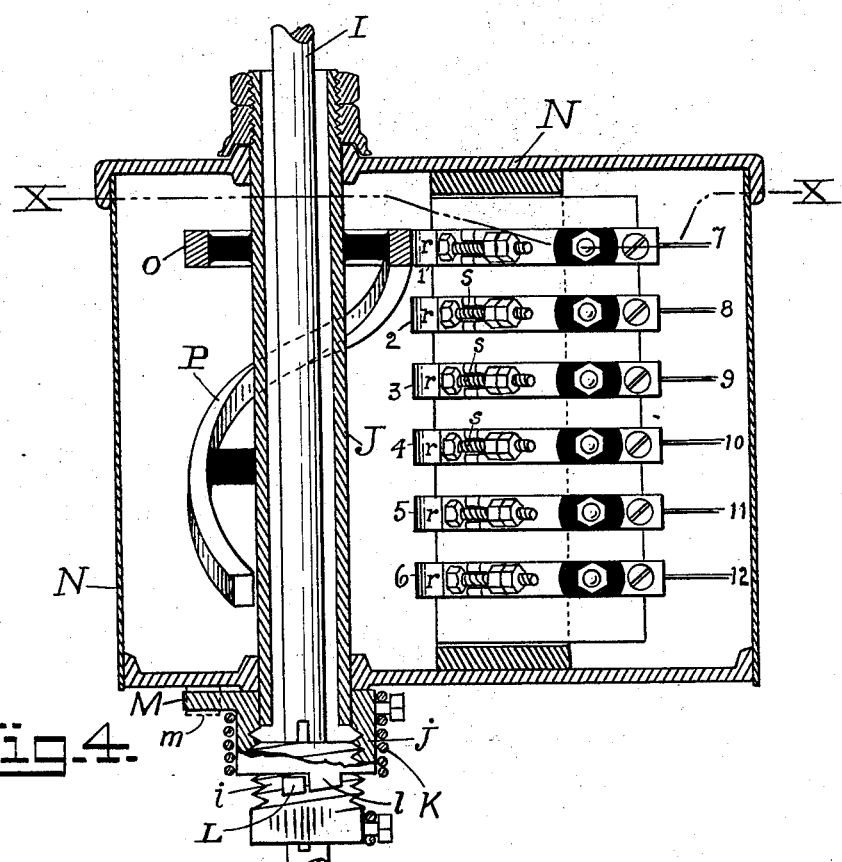

Figure 1 is a perspective view; Fig. 2, an end elevation, partly in section; Fig. 3, a section along the lines $x$ $x$ on Fig. 4, partly broken away. Fig. 4 is a section along the line Y Y on Fig. 3, and Fig. 5 a detail view of the wiring on a car.

Similar characters refer to similar parts throughout the several views.

To the motor-box A, I mount a frame B, within which the armature-shaft C is mounted and which revolves freely within said frame. To the armature-shaft C, I key the wheel C'. The magnets D, which may be one or more in number, two being shown in the drawings, are adjustably mounted in said frame B, preferably by means of bolts $d$ and springs $d'$ thereon, so adjusted that in their normal position the wheel C' shall be out of contact with the magnets. On each side of the wheel C' and connected with the magnets, preferably by bolts $e$ $e$, I secure the curved strap or brake-shoe E, the strap E being so adjusted on the bolts $e$ that the movement of the magnets in either direction will draw the strap in contact with the wheel C'. For the purpose of causing the magnets to assume their normal position after having been drawn to one side or the other I preferably arrange the spring F around the hub $f$ and having one end of the spring resting on one side of the lug G on the motor-box and the other end of said spring on the opposite side of said lug, as shown in Fig. 2. The magnets are connected by the wire H, extending into the car. As thus arranged, when the current is passed through the wire H the magnets, becoming magnetized, attract the wheel C' and move with it until they come in contact with one of the arms $b$ $b'$ of the frame B, and by said movement draw the strap E in contact with the wheel C', exerting friction upon the wheel and tending to stop the revolution of the armature. Thus both the magnets and the strap E, when the current has passed through the magnets, tend to brake the car. After the current has been shut off from the magnets the spring F draws the magnets and the strap E away from the wheel, causing the magnets to assume their position as shown in Figs. 1 and 2, and the armature is free to move.

The brake-shaft I is mounted within the tube J and is preferably provided at its lower end with a spool carrying screw-threads $i$, which spool is keyed to the shaft engaging with screw-threads in an enlarged portion $j$ of the tube J, about which enlarged portion I arrange a spring K, with one end secured to the portion $j$ and the other end of said spring secured to the brake-shaft I near its lower end, the tendency of the spring being to keep the lug L on the brake-shaft in contact with the shoulder $l$ on the portion $j'$, so that the movement of the brake-handle causes the tube J to revolve therewith. I also arrange upon the portion $j$ of the tube J a projecting lug M, adapted to engage with the lug $m$ on the casing N after the spiral metallic plate P leaves the brush 6. Thus after the movement of the brake-handle has brought the lug M in contact with the lug $m$ a further movement thereof will tend to operate the brake-shaft independent of the tube J and against the tension of the spring K, and thus remove the lug L from contact with the shoulder $l$. To the tube J and near the upper end thereof I arrange a metallic circular plate O, which has a portion of its circumference broken away, and connected with which plate O, I arrange a spiral metallic plate P, extending about the tube J, so adjusted that by a revolution of the tube J the spiral P will come in contact successively with the brushes 1, 2, 3, 4, 5, and 6. The brush 1 is connected by wire 7 to the trolley. The other brushes 2, 3, 4, 5, and 6 are connected with the wires 8, 9, 10, 11, and 12, respectively, which in turn are connected with the resistance R, the resistance being connected by the wire H, which leads to the magnets. As thus arranged, the plate O, being in contact with the brush 1, which carries the current to the spiral P, will first come in contact with the brush 2, and the current then passes through the wire 8 and through all of the resistance R to the magnets, sending the minimum amount of current to operate the brake. As the brake-staff is revolved the spiral comes in contact with the brush 3, when a less amount of resistance is placed in circuit with the magnets, and therefore a greater amount of force is applied to the brake. Thus the revolution of the brake-staff increases the amount of current applied to the magnet, and thus increases the braking effect of the apparatus until the spiral is in contact with the brush 6, when the maximum amount of current is conveyed to the magnet. A further revolution of the brake-staff causes the staff to revolve without the revolution of the tube J. The lug M coming in contact with the lug m, when the maximum amount of current is directed to the magnet the mechanical operation of the brake is thus provided for after the magnetic brake has been set. When it is desired to loosen the brake, the brake-staff is revolved in the opposite direction. The spring K brings the lug L in contact with the shoulder l. The tube is revolved until the spiral is off the brushes and the plate O is off the brush 1. When the brakes are released, the lug L is in contact with the shoulder l, held by the spring K, and the lug M is out of contact with the lug m. When the brakes have been applied electrically to the maximum power, the lug M engages with the lug m and the lug L leaves the shoulder l, and further application of the brake, which sets the brake mechanically, removes the lug L farther from the shoulder l and the lug M remains in contact with the lug m.

I preferably arrange the brushes and tube within a casing N on each platform of the car. I show in Fig. 5 a switch T, which may be used for cutting off the supply from the trolley to the braking apparatus when desired.

I do not limit myself to the number of brushes nor to the construction of brush shown in the drawings, although I prefer a brush in which the wearing parts r are adjusted by means of the bolts s s, which wearing parts r may be removed when desired, nor do I limit myself to the form of magnet shown. I, however, prefer an iron-clad magnet, the coils h in the opening in the face of the magnet being protected from water and foreign substances by placing, preferably, a piece of felt U therein and covering the same by babbit or other substance V, pounded securely in position. In this way the coils are protected positively from foreign substances, especially water. Neither do I wish to limit myself to a strap-brake of the form shown and described, since instead of a continuous strap I may make one of several parts jointed together, which may contain renewable brake-blocks and will answer the same purpose.

What I claim as my invention, and desire to secure by Letters Patent of the United States, is—

1. In a combined magnetic and mechanical brake, the combination of a magnet, means for limiting the rotary movement of said magnet, a strap-brake with a means for conducting a current of electricity to the magnet, so connected up that the magnet will tend to draw the strap-brake in contact with the movable portion of the axle to which it is applied, with independent mechanical means for loosening the strap from contact with said movable portion when the current is cut off from the magnet, substantially as described.

2. A combined magnetic and mechanical brake, consisting of a strap-brake, a magnet, a means for conducting electricity to the magnet, said magnet being loosely connected to both ends of the strap-brake, said strap-brake fulcrumed at each end said strap-brake and magnet mounted in connection with an armature-shaft, substantially as described.

3. In a combined magnetic and mechanical brake, a magnet capable of only a limited rotary movement, a strap-brake, with a means for preventing motion in the strap in one direction, on both sides thereof, substantially as described.

4. In a combined magnetic and mechanical brake, a magnet, a strap-brake, said strap having a point of support at each end, each point of support capable of becoming a fixed fulcrum when power is applied by the magnet to the other end of the strap, with a means for allowing for motion between the magnet and the fulcrum of said brake-strap, substantially as described.

5. In a combined magnetic and mechanical brake, a supporting-frame for a magnet, with springs adapted to throw the magnet off and normally keep it away from the wheels except when the magnet is excited, with a spring placed about the hub, the ends of the spring resting on opposite sides of a suitable support, said spring adapted to carry the frame to its normal position after the magnet has ceased to act, substantially as described.

6. In a combined magnetic and mechanical brake, the combination of a magnet capable of a limited movement in either direction; means for limiting the movement of the magnet; a strap-brake, means for connecting said strap-brake with said magnet, a spring adapted to throw the magnet off and normally keep it away from the wheel except when the magnet is excited, but which will permit it to clutch the wheel when the magnet is excited and also to draw the strap-brake in contact with said wheel, substantially as described.

7. In a combined magnetic and mechanical brake, a controller consisting of a spiral contact-piece, a row of stationary contacts so arranged that more or less resistance can be thrown in as desired, said spiral contact capable of a limited revolution on its axis, a means for attaching said spiral contact to a brake-staff, so arranged that the rotating contact follows the motion of the brake-handle through the limited revolution of the contact spiral, with a stop, the brake-staff being capable of still further revolution after the contact-piece has engaged said stop, with a spring connecting the brake-staff with the rotating contact, substantially as described.

8. In a combined magnetic and mechanical brake, a brake-staff, a brake-handle adapted to operate the same, a spiral contact suitably mounted extending partially around the staff, stationary contacts connected with a resistance, a stop on the tube carrying the spiral contact, a lug on the brake-staff with which said stop engages, a spring arranged to keep said lug and stop in connection during a partial revolution of the spiral contact, with a means for arresting the revolution of said spiral contact and permitting the further revolution of the brake-staff, substantially as described.

9. In a combined magnetic and mechanical brake, a brake-staff, a handle for operating the same, a spiral contact-piece suitably mounted extending partially around the staff and adapted to be operated by said brake-staff, a means for arresting the movement of the spiral contact and permitting a further movement of the brake-staff, with a means for making a connection between the brake-staff and the spiral contact when the brake is off, substantially as described.

10. In a magnetic brake, a magnet mounted in connection with an armature-shaft, so arranged that while the magnet has no current passing through it, it is held away from the armature-shaft or a wheel placed thereon, with a strap-brake mounted on each side of the armature-shaft secured thereto and when the brake is off separated from the shaft or wheel, but when a current of electricity is passed through the magnet, the magnet will engage with the shaft and pull the strap-brake in contact with the shaft, engaging the same, with a means for returning the magnet and brake to their normal position away from the shaft or wheel, when the electricity has been cut off from the magnet, with a means for passing a current of electricity through the magnet, substantially as described.

11. In a combined mechanical and magnetic brake, a wheel mounted on an armature-shaft, a frame suitably mounted, one or more magnets mounted in said frame, with spring connections between said magnets and said frame, with a strap-brake mounted on each side of said wheel, a means for connecting said magnets with said strap-brake, with a means for conveying a current of electricity to said magnet or magnets, with a spring arranged to move said magnets away from contact with said wheel when the current is cut off from said magnet, with a means for operating the brake mechanically, substantially as described.

Signed by me at Albany, New York, this 8th day of July, 1899.

JAMES F. McELROY.

Witnesses:
W. S. MORRISON,
CHAS. B. MITCHELL.